United States Patent [19]

Resz et al.

[11] 4,119,687

[45] Oct. 10, 1978

[54] PROCESS FOR THE PRODUCTION OF POWDER-FORM HYDROLYZED ETHYLENE/VINYL ACETATE COPOLYMERS

[75] Inventors: Raoul Resz, Bergisch-Gladbach; Herbert Bartl, Odenthal-Hahnenberg; Karl Nöthen, Leverkusen; Joachim Priemer, Odenthal-Hahnenberg; Aziz El-Sayed, Leverkusen, all of Germany

[73] Assignee: Bayer Aktiengesellschaft, Germany

[21] Appl. No.: 777,331

[22] Filed: Mar. 14, 1977

[30] Foreign Application Priority Data

Mar. 18, 1976 [DE] Fed. Rep. of Germany ....... 2611548

[51] Int. Cl.$^2$ ............................................... B01J 2/06
[52] U.S. Cl. ..................................... 264/9; 260/42.51; 260/42.54; 260/45.8 N; 264/13; 526/10; 526/11
[58] Field of Search ................. 264/9, 13; 526/11, 10; 528/499

[56] References Cited

U.S. PATENT DOCUMENTS

| | | | |
|---|---|---|---|
| 3,344,129 | 9/1967 | Bestian et al. | 526/10 |
| 3,386,978 | 6/1968 | Salzer | 526/10 |
| 3,562,234 | 2/1971 | Resz et al. | 526/11 |

FOREIGN PATENT DOCUMENTS 708,844  5/1954  United Kingdom ..................... 528/499

Primary Examiner—Edward J. Smith
Attorney, Agent, or Firm—Connolly and Hutz

[57] ABSTRACT

A process for the production of partially or completely hydrolyzed ethylene/vinyl acetate copolymer which is suitable for the various powder coating techniques, wherein the polymer solution is extruded in a non-gelled state into water with a temperature no more than 20° C below the gellation temperature and the gelling solution is converted into particles from 0.02 to 5 mm in diameter by means of high shear forces.

11 Claims, No Drawings

PROCESS FOR THE PRODUCTION OF POWDER-FORM HYDROLYZED ETHYLENE/VINYL ACETATE COPOLYMERS

This invention relates to a process for the production of partially or completely hydrolysed ethylene/vinyl acetate copolymers in powder form from solutions thereof in organic solvents.

It is known from DAS No. 1,222,887 that hydrolysed ethylene/vinyl acetate copolymers, which before hydrolysis contain ethylene and vinyl acetate in molar ratios of from 50:1 to 4:1 and in which at least 50% of the acetyl groups present are hydrolysed, are eminently suitable for the production of solvent-resistant heat sealing compositions for sheet-form textiles. It is also known (DAS 1,669,151) that hydrolysed ethylene/vinyl acetate copolymers, which before hydrolysis contain ethylene and vinyl acetate in molar ratios of from 2:1 to 20:1, may be used with advantage as coating powders for metals, ceramics, glass or wood, being applied by any of the various known powder coating techniques, for example fluidisation dip coating and flame spraying, or by the electrostatic powder coating technique.

The powders which are used for the above-mentioned applications must have different grain sizes, according to the particular application for which they are intended, and also, in numerous cases, a suitable grain geometry and quality. Thus, application as a textile sealing material by the powder scattering process requires powders with a particle diameter in the range of from 200 to 500 $\mu$m, whereas powders with particle sizes in the range of from 80 to 200 $\mu$m are required for powder printing, and powders with particle diameters in the range of from 30 to 80 $\mu$m for paste printing. (A full description of the various processes used for the spot coating of the heat sealing material onto textile fabrics may be found in the Journal "Bekleidung und Wasche" Vol. 1968, No. 3, pages 142-153). The powder used for the various powder coating processes described in DAS No. 1,669,151 also has to be present in various grain sizes. For example, fluidisation dip coating requires the use of plastics powders which quantitatively pass through a standard sieve with a mesh width of approximately 300 $\mu$m, the powders only containing small fractions that are not retained by a sieve cloth with a mesh width of approximately 75 $\mu$m. By contrast, the electrostatic powder coating process requires a material which does not contain any constituents with particle diameters of greater than 80 $\mu$m and is, as far as possible, free from fractions smaller than about 20 $\mu$m.

Although the above-mentioned coating powders may also be used in pure form, it is frequently necessary in practice to mix them with additives such as, for example, pigments, fillers, antiagers and light stabilisers, crosslinking additives or other types of additive which provide the coating with a certain desired optical appearance or with certain favourable mechanical and chemical properties. In the standard method, the additive is subsequently mixed with the final plastics powder in powder form. Unfortunately, this method is attended by numerous disadvantages. One disadvantage of fluidisation dip coating, for example, is that mixtures such as these frequently produce a poor, inhomogeneous fluidised bed because, on account of their different granulometry and the fact that their specific gravity differs from that of the plastics powder, the additives are unevenly distributed during fluidisation in the fluidised bed, i.e. they sediment or are lost as flue dust. The dust pollutes the surroundings and represents a loss of material. The same applies to the case where the coating powder itself contains fractions which, during fluidisation, leave the fluidised bed in dust form. On account of the above-mentioned disintegration phenomena, the coatings obtained by this process also show numerous deficiencies such as, for example, inadequate distribution of the additives in the melt formed and poor flow of the molten coating powder as a result of the interference of the added substances. For example, these disturbances are reflected, in the case of small additions of light pigments, in inadequate covering power of the plastics coating and generally in an uneven and, in the case of relatively large quantities of additives, rough surface of the coating. In the case of large additions of pigments, the flow of the plastics powder particles is adversely affected to such a considerable extent that is not possible in this way to obtain pore-free coatings. Other additives which are compatible with the polymer or which are soluble in its melt, such as for example plasticisers, cross-linkers or stabilisers, cannot be uniformly distributed during the short time of a few minutes which is available during fluidisation dip coating in cases where this procedure is adopted and, as a result, are unable to develop their effect adequately. The use of powder mixtures of the above-mentioned type in electrostatic powder coating is attended by similar disadvantages, quite apart from the undesirable promotion of the dissipation of electrostatic charges in the plastics particles through the additive which may, for example, be a pigment.

One conventional method of producing coating powders is mechanical size-reduction or communication, for example by grinding the plastics material, which accumulates either in the form of a granulate or in the form of a coarse-grained precipitated material, depending upon the method used. The polymer, for example, accumulates in granulate form in cases where, as in the standard method, additives are introduced into and mixed with it in an extruder, the additive being kneaded into the melt of the plastics material. Although this process provides for homogenous admixture of the additives with the polymer, it is attended by the disadvantage that the plastics material, already isolated in dry form, has to be melted in an additional operation, and by the disadvantage that, after size-reduction of the solidified melt, the blends are obtained in the form of a relatively coarse granulate.

Since the hydrolysed ethylene/vinyl acetate copolymers obtained in this way are tough and elastic materials, the unavoidable grinding of these materials to the particle size of 10 to 300 $\mu$m required for their use as coating powders presents very considerable difficulties. Grinding can only be carried out with high yields in special-purpose mills equipped with cooling systems, for example using large quantities of liquid nitrogen or dry ice. The costs involved in grinding materials such as these increase drastically with increasing requirements for grain fineness because the grinding yield decreases considerably whilst the consumption of energy increases. In addition, another effect of grinding these tough, elastic hydrolysis products at temperatures above their solidification temperature is that the particles obtained have an irregular, partly flake-like form because conventional mills rather break up the compact elastic material. The particles thus obtained readily interlock with one another and, as a result, produce a powder with poor free flow properties which is substantially or completely unsuitable for use as a coating powder.

In one known process, described in US-PS No. 2,534,079, for isolating hydrolysed ethylene/vinyl acetate copolymers, which before hydrolysis contain ethylene and vinyl acetate in a molar ratio of from 1:1 to 4:1 and which are hydrolysed to a degree of at least 50%, from their solutions in a volatile solvent using the apparatus described therein, the end product is also a coarse sintered granulate whose size-reduction involves difficulties similar to those involved in size-reducing the granulate obtained from the melt of the polymer. In this process, the organic solvent is removed by bringing the hydrolysis solution into contact with an aqueous protective colloid solution and steam at temperatures of from 90° to 95° C. Another disadvantage of this process is the fact that the protective colloid added, for example starch, can only be incompletely removed from the isolated product by washing. However, materials containing even small quantities of protective colloids or emulsifiers are not suitable for the production of coating powders because they show levelling faults when melted onto the article to be coated. These faults are reflected in an uneven surface and also in crater and pore formation. In cases where materials such as these are used as heat sealing materials for textile fabrics, bond strength is generally reduced by comparison with the pure products.

In the process described in US-PS No. 3,386,978 for isolating hydrolysed ethylene/vinyl acetate copolymers by gradually introducing solutions thereof in mixtures of hydrocarbons and alcohols into boiling water, with simultaneous removal of the organic solvents by distillation with steam, the hydrolysis product is not obtained in the form of a powder with a particle diameter of less than 500 $\mu$m, but instead in the form of a coarse friable mass which frequently tends to stick and which can only be removed with difficulty from the residues of solvent present in it. The tough coarsely particulate masses can only be converted into powder form by the above-described size-reduction techniques using coolants, such as for example liquid nitrogen or dry ice, which involves very high costs.

It is also known (DAS No. 1,301,539) that hydrolysed ethylene/vinyl acetate copolymers, which before hydrolysis contain ethylene and vinyl acetate in a molar ratio of from 4:1 to 50:1 and in which at least 50% of the acetyl groups present are hydrolysed, can be produced with particle diameters of from 0.1 to 0.7 mm by isolation from their hydrolysis solutions. The hot hydrolysis solution containing organic solvents is gelled by cooling to temperatures below 60° C., strands 0.3 to 5 mm in diameter are formed from the gelled solution, the strands obtained are size-reduced in water or with water to a particle size of from 0.1 to 5 mm, the gel particles obtained are separated from the organic solvents under reduced pressure at temperatures of from 20° to 80° C., any hydrolysis catalysts still present are washed out, and the copolymer is isolated and optionally subjected to an additional grinding process. This process also has considerable disadvantages in cases where it is intended to be used for the production of polymer powders with a particle diameter of less than 0.3 mm, because it has been found that the formation of strands with a diameter of less than 0.3 mm from the solution gelled in a screw extruder by means of the die block used in DAS No. 1,301,539 involves considerable difficulties because the narrow capillary tubes become blocked very quickly and, as a result, obstruct the process. In cases where the dies have a bore diameter of less than 0.3 mm, for example less than 0.2 mm, the process is no longer workable for the above reason. Although it is possible heavily to dilute the solutions to be worked up to such an extent that the gel particles produced in the gelling screw disintegrate on account of their softness during removal of the solvent by distillation with steam, the powders thus obtained have a particle diameter of less than 0.01 mm, which cannot be influenced and which is too small for the powders to be used as coating powders, and the powders also have a low bulk density which is another considerable disadvantage. On the other hand, the necessary heavy dilution of the polymer solution involves the use of large quantities of solvent which adds considerably to the cost of the process. Recovery of these solvents also involves high costs. High costs are also involved in using the gellation screw which is expensive to produce and operate, and it is for this reason that simplification of this stage of the process would appear to be urgently necessary. Size-reduction by grinding of the moist or dry solvent-free material obtained in accordance with DAS No. 1,301,539, which has a particle diameter of greater than 0.3 mm, involves difficulties similar to those involved in size-reduction of the granulate produced from the melt because, in standard plastics mills, for example in a Pallmann mill, the heat generated by grinding cannot be dissipated and the intensely heated product melts or softens and sticks. Accordingly, it is not possible by these methods to achieve fine grinding to particle diameters of less than 0.1 mm. In addition, grinding to particle diameters of from 0.1 to 0.3 mm can only be carried out with very low grinding yields. Grinding in the presence of water in conventional colloid mills is also impracticable on account of the viscosity of the hydrolysis product.

DAS No. 1,301,539 does not provide any information on the possibility of producing powders containing additives in homogeneous finely divided form.

In addition, German Offenlegungsschrift No. 2,345,061 describes a process for the production of partly or completely hydrolysed ethylene/vinyl ester copolymers which contain from 0.5 to 95.5 mole % and preferably from 3 to 30 mol % of vinyl acetate (i.e. ethylene and vinyl ester in molar ratios of from 199:1 to about 1:20, preferably from about 32:1 to 2.3:1), in powder form. In this process, the ethylene/vinyl ester copolymer is subjected to alcoholysis in a mixture of a hydrocarbon and a low-boiling alcohol and an alkaline or acid catalyst and the hydrolysis product is precipitated by the addition of considerable quantities of the readily volatile alcohol at the boiling point of the mixture, the material accumulating in powder form with particle diameters in the range of from 100 to 300 $\mu$m. Although this process provides for the production of powders which are suitable for use as coating powders or as heat-sealing powders, it has the disadvantage that very large quantities of the organic solvent have to be used and have to be recovered in pure form from the mixture obtained because sufficiently fine-grained powders with particle diameters of mainly below 300 $\mu$m can only be obtained with solids concentrations of less than 10% by weight. This factor makes the process extremely expensive and hence uneconomical. In addition, it is not possible by this process to produce powders which contain additives insoluble in water but soluble in organic solvents such as, for example, cross-linking subtances or stabilisers against degradation initiated by oxidation or UV-light, platicisers, etc. When precipitation is carried out in accordance with DOS 2,345,061, the additives which are insoluble in the organic solvents used, such as for example inorganic or organic pigments or fillers, only remain partly in the precipitated polymer, but to a considerable extent are present in finely suspended form in the solvent. These finely divided pigments seriously complicate separation of the powder mixture by filtration and the powder obtained, which is inhomogeneous in composition, is not well suitable for use as a coating powder.

In addition, German Offenlegungsschrift No. 2,035,362 describes a process for recovering the hydrolysis product of ethylene/vinyl acetate copolymers, which contain ethylene and vinyl acetate in molar ratios of from 1:1.5 to 1:3, by precipitating the methanolic or methanolic-aqueous solution by extrusion into a coagulation bath which consists of water or of a mixture of methanol and water and which has a lower methanol concentration than the extruded solution. In this process, granulates with particle diameters of less than 500 μm, rather than powders, are obtained and have to be converted into fine-grained powders by grinding in the presence of coolants. In addition, this process cannot be applied to ethylene/vinylacetate copolymers which, in non-hydrolysed or hydrolysed form, are insoluble in methanol or in methanol/water mixtures. However, these ethylene/vinyl acetate copolymers include any ethylene/vinyl acetate copolymers which, before hyrolysis, contain ethylene and vinyl acetate in molar ratios of greater than 2:1.

Furthermore, German Offenlegungsschrift No. 2,161,556 describes a process for the production of ethylene/vinyl alcohol copolymers by the alcoholysis of ethylene/vinyl ester copolymers with anhydrous primary alcohols in the absence of inert solvents and in the presence of alkaline catalysts, the process being carried out in the presence of the alkyl ester formed as secondary product and the ethylene/vinyl alcohol copolymer obtained being separated in powder form by slowly cooling the reaction mixture. This process also involves the use of large quantities of the organic solvent and is attended by the disadvantage that separation of the alkyl ester of acetic acid, which accumulates in large quantities from the corresponding alcohol, can only be carried out at considerable expense. Recovery of the alcohol and the acetic from these alkyl esters, which is absolutely essential to the economy of the process on account of the relatively high price of these alcohols, is extremely complicated and expensive. Drying of the alcohol-moist powder obtained by filtration is also difficult and laborious on account of the relatively high boiling points of these alcohols and on account of their tendency to adhere particularly firmly to the polymer which also contains hydroxyl groups. The drying necessitates special precautions and an inert gas atmosphere on account of the increased danger of a dust explosion during drying. Another disadvantage of this process is that it is not possible to produce powders containing additives which are insoluble in water but soluble in organic solvents such as, for example, cross-linkers, stabilisers, plasticisers, etc. The co-precipitation of the finely divided materials insoluble in the alcohols used, such as for example pigments and fillers, with the hydrolysed ethylene/vinyl acetate copolymer is also impracticable in this case because a large amount of these substances is precipitated separately from the polymer during cooling of the solution. Heterogeneous powder mixtures such as these, which are difficult to isolate and handle, are unsuitable for use as coating powders.

Although numerous processes for the production of polymer powders from their solutions in organic solvents have already been proposed, all these processes are attended by considerable technical and economic disadvantages and, when they are used for the production of powders from hydrolysed ethylene/vinyl acetate copolymers, do not give materials which would be suitable for use as coating powders for metals, glass, ceramics or wood by standard powder-coating techniques. Most of the known processes ae concerned with the production of powders and dispersions from high-polymer compounds of different compositions, more especially from polyethylene and other polyolefins. These processes are based in particular on the behaviour of solutions of such polymers in certain solvents or solvent mixtures in precipitating in powder form, and it is for this reason that the measures described therein cannot be applied, or can only be conditionally applied to the production of powders from hydrolysed ethylene/vinyl acetate copolymers which, after hydrolysis, contain a large amount of copolymerised vinyl alcohol and show a different type of solution behaviour. A process which is suitable for the production of useful coating powders must provide for the production of materials which satisfy practical requirements in regard to purity, grain size distribution and grain quality. Other requirements which a suitable process must satisfy are the ready controllability of the particle sizes obtained, the possibility of homogeneously working in additives which are insoluble in water without any loss of material and the suitability of the process for the simultaneous removal of water-soluble impurities and catalyst residues from the solution of the hydrolysed ethylene-vinyl acetate copolymer. Solutions such as these always exist when the polymer powder is isolated from the hydrolysis solution formed during production. These solutions always contain catalyst residues such as, for example, alkali metal hydroxides, alkali metal acetates, mineral acids or their salts and, in some cases, other water-soluble impurities. Another requirement is the suitability of the process for economic and, if possible, continuous working.

Any polymer powders which contain even small quantities of surface-active substances, such as emulsifiers and protective colloids, are unsuitable for the production of coatings by known powder-coating techniques. This is because surface-active substances give rise during coating to the above-mentioned disturbances in the levelling of the polymer powders. Accordingly, substances such as these have to be removed as completely as possible from the polymer powders.

On the other hand, however, it is known that, in many cases, this involves considerable difficulties. For example, the hydrolysed ethylene/vinyl acetate copolymers show an increased tendency to retain polar substances containing hyrophilic groups, including in particular the usual emulsifiers and protective colloids, by adsorption through their hydroxyl groups. This behaviour is intensified by the fact that the above-mentioned copolymers usually accumulate in a porous form which greatly increases their adsorption capacity. Accordingly, the removal of emulsifiers and protective colloids from hydrolysed ethylene/vinyl acetate copolymers requires prolonged and intensive treatment with water. In many cases, for example when water-soluble high molecular weight substances, for example starch, starch and cellulose derivatives, polyvinyl alcohol, polyacrylic acid etc., are used as protective colloids during isolation, they cannot be completely removed by washing with water.

British Patent Specifications Nos. 571,814 and 617,052 describe a process for the production of polyethylene powder by cooling a hot solution of the polyethylene, optionally containing pigments, with mechanical mixing, filtering and removing the solvent by evaporation in the presence of an organic solvent which does not dissolve the polyethylene. If an attempt is made to apply this process to the production of powders from hydrolysed ethylene/vinyl acetate copolymers, it is found that, depending upon the composition of these copolymers which for the most part also require different solvents than the proposed copolymers, coarse-grained friable masses or dust-form products are obtained which are either unsuitable for use as coating powders on account of their fineness or which have to be converted into coating powders by mechanical grinding of the isolated material. However, this involves the technical difficulties to which reference has already been made. In addition, the polymer and the additive optionally added which is dissolved or suspended in the solution of the polymer disintegrate to a greater or lesser extent during the process. As a result, the additive is partially lost during filtration and, after removal of the solvent, is present in disintegrated form alongside the polymer and gives rise to problems in the practical application of the powder. Furthermore, the process is unsuitable for isolating the hydrolysed ethylene/vinyl acetate copolymers from the hydrolysis solution containing water-soluble catalysts residues. Finally, this process cannot be carried out continuously.

Similar unsatisfactory results are obtained when an attempt is made to apply the production process described in German Patent Specification No. 1,077,424 and in German Offenlegungsschrift No. 1,494,355 to the production of powders from hydrolysed ethylene/vinyl acetate copolymers. Since in this case the type of solvents used, the precipitation conditions, the quality of the powders, their particle size, and their particle size distribution change greatly with the composition of the polymer, it is not possible to provide a reliable, reproducible process for the copolymers of different composition consisting of ethylene and vinyl alcohol units and, optionally, of vinyl acetate units, too. In addition, these processes give rise, to an even greater extent than the processes described in British Patent Specification Nos. 571,814 and 617,052, in cases where an additive is added to the polymer solution, to the formation of materials of inconsistent composition whose inconsistency is again determined by the properties of the substance added, by the composition of the hydrolysed copolymer and by the type of solvents and precipitants used. Furthermore, a process such as this cannot be carried out continuously.

For the same reasons, it is also not possible to apply a process based on precipitation of the polymer from a solution by means of a precipitant to the production of coating powders from a variety of different hydrolysed ethylene/vinyl acetate copolymers, especially in cases where they are intended to contain added components of one type or another in homogeneously distributed form. In addition, the expensive use of large quantities of solvents and precipitants and also their recovery and separation would make these processes uneconomical.

The process described in British Patent Specification No. 721,908 uses another organic solvent with which the solvent used for dissolving the polyethylene is intended to be extracted from the solution gelled by cooling. Although this process would enable the residues of catalyst to be removed from the gelled particles of the hydrolysis solutions, this would be accompanied by removal of the additives soluble in the extractant. In addition, grain size cannot be controlled in this process and the powders obtained are too fine for use as coating powders. Recovery of the solvent and extractant and their purification involve considerable technical outlay and add very considerably to the cost of the process.

German Auslegeschrift No. 1,160,610 describes a process for the production of polyethylene dispersions in the presence of emulsifiers, and of polyethylene powders in the absence of emulsifiers. The process requires a highly effective stirrer which is described in the Patent Specification. Attempts to apply this process to the production of powders from hydrolysed ethylene/vinyl acetate copolymers in the absence of emulsifiers produced coarse-grained products which could be ground to grain sizes of less than 300$\mu$ only with considerable technical outlay. Removal of the solvent from the coarse particles requires long evaporation times, whilst condensation of the solvent vapours necessitates elaborate, highly intensive cooling. Even the addition of emulsifiers produced no improvement. Only low molecular weight hydrolysis products precipitated from dilute solutions produced powders of adequate fineness. However, these powders are unsuitable for use as coating powders on account of their low molecular weight. In addition, the process is uneconomical on account of the large quantities of recirculated solvent. Furthermore, the process is not suitable for the production of relatively large quantities of powder because high-performance apparatus of the type described in the Patent Specification with a sufficiently intense stirring effect are extremely expensive and cannot be continuously operated.

In addition, U.S. Pat. No. 3,245,934 describes a method for the production of polyolefin powders by suspending a gel, with the assistance of an intensive size-reducing machine, in an emulsifier-containing water phase. The process necessitates gellation of the polyolefin solution before size-reduction and the use of emulsifiers. In view of the difficulties involved in handling the gelled mass and also in the necessary removal of the emulsifier used from the porous particles produced, this process is not really suitable for the production of powders from hydrolysed ethylene/vinylacetate copolymers. Similar disadvantages attend the processes known from British Patent Nos. 884,614 and 1,022,053, according to which hot, highly dilute solutions of polyethylene in organic solvents, containing about 10 to 20% by weight of polymer, are suspended in cold aqueous emulsifier solutions. In these processes, the organic solvent is evaporated off under reduced pressure either from the suspension or from the material filtered off. Apart from the disadvantage of having to use emulsifiers, the additives optionally added, which are soluble in the solvents used but insoluble in water, are partially lost insofar as, during evaporation, they emerge from the polymer particles together with the solvent and are precipitated in the aqueous phase in such finely divided form that they cannot be completely separated, if at all, together with the polymer. In addition, the unavoidable use of relatively dilute solutions of the polymer with a polymer content of less than 20% by weight makes these processes uneconomical.

An attempt to suspend solutions of relatively high molecular weight hydrolysed ethylene/vinyl acetate copolymers, suitable for the production of coating powders, by this process produces a coarse-grained material which can only be converted with considerable difficulty to a powder with a particle size of less than 300μ by grinding.

From the foregoing explanations and from the analysis of conventional methods for producing polymer powders from solutions thereof in organic solvents has arisen the objective of the present invention, namely to find a simple, economic process which can be carried out continuously on a commercial scale for the production of powders from hydrolysed ethylene/vinyl acetate copolymers. In view of the adverse influence of protective colloids and emulsifiers upon the quality of the heat sealing and coating powders, the need to use additives such as these is to be eliminated in accordance with the present invention. In order to minimise the cost of the isolation process, it is also intended in accordance with the invention to convert the solution of the polymer obtained after hydrolysis into powder form without dilution and without the use of organic precipitants. Another object of the invention is to provide a process by which it is possible to produce copolymer powders of the above-mentioned type which contain additives substantially insoluble or completely insoluble in water in such fine homogeneous distribution that they are suitable for use as coating powders by any of the various conventional powder coating techniques. Finally, the new process is intended to enable grain sizes to be controlled and distributed in a range of from about 20 to 500 μm so that it is possible to produce, by one and the same process and according to particular requirements, powders which are suitable for use as heat sealing materials in the scattering, powder printing or paste printing process or which may be used as coating powders for fluidisation dip coating and flame spraying and also for electrostatic powder coating.

It has now been found that the objects defined above can be achieved, i.e. powders suitable for use in the various techniques for the heat-sealing of textiles and for coating metal, ceramics, glass or wood can be obtained, by extruding a solution, which gels at temperatures in the range of from 20° to 80° C. and which optionally contains additives substantially or completely insoluble in water in quantities of up to 50% by weight, of a partially or completely hydroylsed ethylene/vinyl acetate copolymer which, before hydrolysis, contains ethylene and vinyl acetate in copolymerised form in a molar ratio of from 1:2 to 20:1 and in which at least 50 mol % of the acetoxy groups are hydrolysed, in organic solvents in a warm, still liquid non-gelled state, i.e. at a temperature at least 5° C. above the gellation temperature, through jets with a cross section of 4 to 400 mm$^2$ and at rates of flow of 0.01 to 5 m/second into water at a temperature no more than 20° C. below the gellation temperature of the polymer solution, converting the gelling solution into particles 0.02 to 5 mm in diameter by means of an apparatus generating high shear forces, and removing the adhering organic solvent by distillation with steam.

The process according to the invention enables powders to be produced from solutions of the hydrolysed ethylene/vinyl acetate copolymers which, in regard to composition and polymer concentration, are normally obtained during the conventional production of these polymers. Solvent mixtures of the kind in question are, for example, mixtures of aliphatic and aromatic hydrocarbons containing from 5 to 20 carbon atoms and alcohols containing from 1 to 2 carbon atoms and their acetic acid esters or mixtures of alcohols containing from 1 to 10 carbon atoms and their acetic acid esters. They generally contain the hydrolysis product in quantities of from 20 to 50% by weight and preferably in quantities of from 30 to 40% by weight. It is extremely surprising that powders with a rounded particle shape and with a compact, free-flowing quality are obtained under the process conditions according to the invention because it is known that the introduction of the viscous solutions obtained during the hydrolysis of ethylene/vinyl acetate copolymers into a liquid medium which does not dissolve the polymer, even with intensive stirring, generally results in the formation of a precipitate with a filament-like or at least fibrous structure which very quickly adheres to the stirrer so that, thereafter, continuation of the precipitation process is soon prevented.

The conditions prevailing during the gellation and dispersion process are of crucial importance to the quality of the powder-form material formed, to its particle size and particle shape. In order to prevent the particles from re-combining, size-reduction has to be carried out completely under water. The function of the water is to cool the particles formed during dispersion of the solution from their surface, at the same time to remove the water-soluble organic solvents from them, and to act as a transporting agent for the precipitated product during subsequent distillation with steam and as an entraining agent for the adhering organic solvent. The temperature of the water used as gellation and dispersion medium should be distinctly below the gellation temperature of the polymer solution, preferably 5° C. or more below that temperature, in order to prevent the particles formed from adhering to one another. On the other hand, temperatures considerably more than 20° C. below the gellation temperature should be avoided because mechanical size-reduction then no longer has to take place in partially gelled, semi-liquid form, but instead in largely gelled form. However, under the conditions prevailing during the process according to the invention, large, frequently elongate and fibrous and, occasionally, even filament-like pieces of the delivered material are formed in this case which can easily interlock with one another and give rise to obstructions, especially when the process is carried out continuously. It is therefore an important feature of the process according to the invention that size reduction, or at least initial size reduction, is carried out in liquid or semi-liquid form, i.e. during the gellation process, when the material is still capable of forming the rounded particles. By virtue of their solvent content, the rounded particles formed in the favourable temperature range according to the invention have a porous quality and, accordingly, may largely be freed both from the adhering organic solvents and also from the water-soluble residues of the transesterification catalysts and from hydrolysis residues, such as for example sodium acetate or sodium hydroxide, by distillation with steam. Polymer powders which contain more than 0.1% of such inorganic constituents are barely suitable for the production of coatings and, with contents of more than 1%, are totally unsuitable because they disturb the uniform, smooth levelling of the melted material and adversely affect both the imperviousness of the coatings produced therewith and their adhesion to the substrate.

Another significant advantage of the process according to the invention is that there is no longer any need to add emulsifiers and protective colloids which in numerous known processes are added to prevent tackiness.

The size of the gelled particles of the polymer solution, suspended in water, obtained by the process according to the invention is determined by the rate of flow of the solution through the jets arranged on the gellation and dispersion vessel and by the intensity of the shear forces generated in the aqueous phase. The necessary shear forces are preferably generated by vigorous mechanical agitation of the water phase by means of a stirrer or size-reduction unit, although it is also possible to apply methods in which the shear forces are generated by a pure hydrodynamic flow. Suitable stirrers are, for example, high-speed stirrers operated at rotational speeds of at least 200 revolutions per minute, but preferably at rotational speeds of more than 500 revolutions per minute. One example of a suitable stirrer is the type NOSHK 300 special-purpose mixer manufactured by the Papenmeier Company of Pivitsheide (Westphalia). The warm liquid polymer solution is dispersed by the abovementioned methods into particles approximately 0.3 to 4 mm in diameter. Size reduction by means of high-speed stirrers has a lower limit at particle diameters of from about 0.3 to 0.5 mm, because, for hydrodynamic reasons, the relatively small particles are beyond the reach of apparatus such as these. Accordingly, further size-reduction is best carried out by means of size-reduction machines which force the gel particles to pass through a predetermined narrow gap with a maximum width of 0.5 mm. The material has to remain suspended in the water during this process. In order to accomplish this task, colloid mills or homogenisers are preferably used. Apparatus particularly suitable for this purpose are, for example, the Ultra-turrax stirrers and Dispax reactors manufactured by Messrs. Janke und Kunkel, Staufen (Breisgau), the homogenisers manufactured by the Supraton Company, Dusseldorf, and the colloid mills manufactured by Probst und Class, by Rastatt and Fryma, Rheinfelden. The particular construction of the size-reduction apparatus may be varied within wide limits providing they are able to generate sufficiently powerful shear forces and sufficiently intense turbulence. In one modification of the process, gellation of the solution is initially carried out under moderate shear stressing and the gelled, but still soft, solvent-containing particles are further size reduced under water in a colloid mill.

It is possible with colloid mills of the abovementioned type to influence the particle size and particle size distribution of the size-reduced products within wide limits by varying the gap widths and rotational speed of their size-reducing components and by their construction. The size reduction of the polymer particles is much easier to carry out in this solvent-containing phase than in a phase freed from the solvent by distillation with steam or even in dry phase because, on the one hand, considerably less mechanical energy has to be expended in the presence of the solvent-containing gel and because, on the other hand, the ground material is heated to a far lesser extent during size reduction in the aqueous suspension by virtue of the high thermal capacity of water than in cases where the dried product is ground.

In a modified procedure, mechanical size reduction of the gelled particles with a diameters of the order of 0.3 to 10 mm to particle diameter of less than 0.3 mm is carried out in an apparatus which enables the size-reduced gel particles, which have reached a certain, desired particle diameter during the grinding process, to be continuously removed. This apparatus consists of a water-filled vessel which is divided in two by a sieve cloth so that the gel particles subjected to the grinding process which are intensively stirred in one half of the vessel enter the other half of the vessel as soon as their size enables them to pass through the meshes of the sieve cloth, and are continuously removed from this other half of the vessel. The sieve cloth may be arranged in the vessel in any way as long as provision is made, in the form of stirring, to ensure that the adequately size-reduced particles are able to pass over into the second, separated part of the vessel under the surface of the water. Size-reduction of the material may be carried out both in a water-filled vessel by means of an immersed size-reduction unit and also outside the vessel, for example in a colloid mill or in any other suitable apparatus. In the latter case, the aqueous suspension of the gel particles is best pumped through a size-reducing machine of this type. By suitably selecting the sieve cloth, this arrangement enables the particle size of the ground material to be kept substantially in the range of from 50 to 300 μm. In addition, the described arrangement provides for continuous operation insofar as the gel suspension being ground is continuously replenished with new material and the fine material separated off is continuously removed from the vessel. Depending upon the density of the gel particles, this may be done either by draining off the sump which has collected in the size-reduction vessel or by continuous decantation. If size reduction is carried out in an apparatus outside the water-filled vessel, it is not necessary to size-reduce all the gelled particles to the required particle size in a single passage through the size-reduction apparatus. On the contrary, it is preferred to reduce only a fraction of the particles, preferably amounting to no less than 10%, to the required grain size. The smaller this fraction, the more uniform is the grain size of the material passing through the sieve cloth. The arrangement according to the invention not only enables particle size to be influenced by the choice of the mesh width of the sieve cloth, but also enables the particle size distribution to be influenced, for example by suitable adjustment of the size-reduction apparatus, by the pumping rate and by the intensity of stirring in the separation vessel.

The sieve cloth used for separating off the fine fractions of the gel suspension may consist of any materials such as, for example, fine steel, phosphor bronze or textile filaments. In order to obtain a suspension with particles ranging from 10 to 300 μm in diameter, it is best to use sieve cloths with a mesh width of from about 50 to 500 μm. Experience has shown that, under the conditions of the process, the sieve cloth only allows through particles which have a considerably smaller diameter than the mesh width of the cloth. Accordingly, it is preferred to use somewhat larger sieves than those used for conventional dry screening operations. The necessary fineness of the sieve cloth is determined by the particular test conditions, by the intensity and nature of stirring and by the arrangement of the sieve cloth.

The manner in which the water-filled vessel is divided by the sieve cloth may differ widely and is best adapted to the type of stirring in the zone in which the material being size-reduced is situated. A suitable combination consists of, for example, a basket produced from sieve cloth which is immersed in water and of which the contents are kept in motion by means of a propeller stirrer. In this case, the water is drawn in at the lower end of the basket and expelled laterally, so that circulation is established throughout the vessel and the gel particles are transported to the sieve cloth.

It is an important feature of the process for separating the fine fractions from the suspension that the gel particles move freely in the aqueous phase and are able to pass through the sieve cloth whilst floating freely in the water. Separating the fine fractions by the conventional method of wet screening, for example using a vibratory screen, should be avoided on account of the adhesion of the particles to one another.

The arrangement of the individual components of the apparatus described here for separating off the fine gel fractions may, of course, be very different without in any way altering the above-explained principle of the process, namely removing the fine fractions from the gel suspension during the mechanical size-reduction process under water by means of a sieve cloth.

The process according to the invention gives polymer powders which are eminently suitable for use as coating powders because they are obtained in a form, in a fineness and in a purity which enables them to be processed by conventional powder coating techniques to form smooth, pore-free coatings on metals, ceramics, glass or plastics materials. In addition, the further developed embodiment described above provides for better control of the manufacturing process in regard to the particle size and particle size distribution of the powder obtained, and enables the required particle size to be produced in a narrow particle size distribution.

Another advantage of the process is that the powders, which are obtained from solutions of the polymers containing substantially water-insoluble additives in suspended or dissolved form, contain these additives in such a finely divided absorbed form that they are not released during removal of the solvents by distillation with steam. This behaviour is surprising because other polymers, such as for example polyethylene or ethylene copolymers, do not show this effect at all or do not show it to this extent.

A further advantage of the process according to the invention is that it enables additives which are reactive at elevated temperatures, such as for example crosslinkers or blowing agents, to be uniformly distributed in the coating powder. In the conventional process carried out in an extruder, this is not possible on account of the high temperatures prevailing in the extruder.

In general, the coatings mixed with additives by the process according to the invention show excellent mechanical, optical and chemical properties which are superior to those of coatings produced by conventional processes.

Another particular advantage of the process is that it may be applied to the size-reduction of gelled solutions of hydrolysed ethylene/vinyl acetate copolymers differing widely in composition, providing the gelled solution has a sufficiently firm, but not over hard consistency. This result may readily be obtained by adjusting the concentration of the polymer in the solution to a suitable value. The hydrolysed ethylene/vinyl acetate copolymers used may be produced by any known process. The polymers which, after hydroylsis, may be converted into powder form by the process according to the invention contain ethylene and vinyl acetate in a molar ratio of from 1:2 to 20:1, preferably from 2:1 to 10:1, in copolymerised form. Some of the copolymerised vinyl acetate, i.e. up to about 30 mole %, may be replaced by other compounds containing olefinic double bonds which are copolymerisable with ethylene without any adverse effect upon the outcome of the process. Monomers such as these are the vinyl esters of aliphatic and aromatic carboxylic acids with one or three to twenty carbon atoms such as, for example, vinyl propionate, vinyl laurate, vinyl stearate, vinyl versatate (vinyl ester of the so-called versatic-10 acid manufactured by the Shell Company; this acid is a mixture of heavily branched aliphatic monocarboxylic acids with 10 carbon atoms corresponding to the general formula $R_1R_2C(CH_3)—CO_2H$, in which $R_1$ and $R_2$ represent alkyl radicals with 1 to 6 carbon atoms), vinyl benzoate etc., vinyl ethers of aliphatic saturated alcohols with 1 to 4 carbon atoms such as for example, vinyl methyl, vinyl butyl, vinyl isobutyl, vinyl hydroxyethyl ether etc., unsaturated aliphatic carboxylic acids such as, for example, acrylic acid, methacrylic acid, maleic acid, fumaric acid, itaconic acid and the esters of these acids with saturated aliphatic alcohols, and also N-vinylamides such as, for example, N-vinyl formamide, N-vinyl acetamide, N-vinyl pyrrolidone and N-vinyl caprolactam. Ethylene/vinyl acetate copolymers grafted with the monomers listed above and containing up to about 30% by weight of grafted monomer, may also be converted into powder form by the process according to the invention. The molecular weight (weight average $M_w$) of the ethylene/vinyl acetate copolymers may vary within a wide range of from 5000 to 100,000 and preferably from 10,000 to 50,000. Polymers such as these have melt indices of from 1 g/10 mins, as determined in accordance with condition E, to 50 g/10 mins, as determined in accordance with condition B (DIN 53 735). The molecular weight has a considerable influence upon the quality of the powder formed. The lower the molecular weight of the polymer, the higher may be its concentration in the solution.

Relatively compact particles are formed from highly concentrated solutions whilst relatively porous particles are formed from more dilute solutions, so that it is more difficult to obtain compact particles from high molecular weight products and porous particles from low molecular weight products. It is preferred to use solutions with the highest practicable concentrations, the upper limit being imposed both by the pumpability of the solutions through the pipes and by the mechanical dispersibility of the gelled solutions. Highly dilute solutions having a solids content of 20% by weight or less — which should be avoided on economic ground — show a tendency to disintegrate into powders with overfine particle sizes of less than about 20 μm which are not suitable for use as textile heat-sealing materials and coating powders.

Hydrolysis is advantageously carried out in an anhydrous medium in the presence of alkaline or acid catalysts as a transesterification reaction with aliphatic alcohols. In the context of the invention, hydrolysis is the replacement of the acetoxy group by a hydroxy group. Preferred alkaline transesterification catalysts are alkali metal alcoholates such as, for example, sodium methylate or potassium ethylate whilst preferred acid catalysts are hydrogen halides such as, for example, hydrogen chloride, sulphuric acid or organic sulphonic acids such as, for example, toluene sulphonic acid. In order to obtain rapid and extensive alcoholysis of the ethylene/vinyl acetate copolymer, it is preferred to use as aliphatic alcohols primary alcohols containing from 1 to 5 carbon atoms such as, for example, methyl, ethyl, propyl, n-butyl, n-amyl and isoamyl alcohol. By carrying out the transesterification reaction in the presence of methyl alcohol in particular, the transesterification equilibrium may be displaced in favour of the hydrolysed polymer by distilling off the methyl acetate as the most readily volatile constituent.

When ethylene/vinyl acetate copolymers of high ethylene content are hydrolysed in the presence of primary aliphatic alcohols containing from 1 to 5 carbon atoms, it is generally necessary to use solution promoters. Suitable solution promoters, which are added to the hydrolysis mixture, are organic solvents which are inert under the hydrolysis conditions such as, for example, aliphatic or aromatic hydrocarbons and their chlorination products, carboxylic acid esters, ketones or ethers.

Depending upon the composition of the copolymer it is possible to use different solvents and solvent mixtures as the solvents which are capable of dissolving the polymers according to the invention at elevated temperatures, preferably above 50° C., and from which the dissolved product precipitates in jelly form at a lower temperature, preferably not below 30° C. Thus, for copolymers containing more than about 70% by weight of copolymerised ethylene, it is possible with advantage to use certain solvents having only limited miscibility with water such as, for example, methylene chloride, chloroform, trichlorethylene, perchlorethylene, methyl isobutyl ketone, cyclohexanone, amyl alcohol and isoamyl alcohol. These solvents have the advantage that, after distillation with steam, they may readily be separated off from the water and reused without drying. The solvents used for copolymers containing less than 70% by weight of copolymerised ethylene are, with advantage, mixtures of the above-mentioned solvents or of aliphatic and aromatic hydrocarbons with methyl and ethyl alcohol, because these mixtures have a much better dissolving power on these polymers than mixtures which do not contain any alcohol. Hydrolysed copolymers which, before hydrolysis, contain ethylene and vinyl acetate in molar ratios of from 5:1 to 2:1 and which are hydrolysed to a degree of at least 80%, are preferably dissolved in solvent mixtures such as these. Solutions such as these of hydrolysed ethylene/vinyl acetate copolymers are known, for example in the form of solutions which are obtained by the standard hydrolysis process described above by transesterification with alcohols, for example methanol or ethanol, in the presence of alkaline or acidic transesterification catalysts. In general, these solvent mixtures additionally contain small quantities of the acetic acid esters of the alcohols used. In this case, the aliphatic alcohol is recovered from the aqueous phase after distillation with steam. The use of aliphatic alcohols containing 3 and 4 carbon atoms instead of methyl or ethyl alcohol is also possible, although their separation from water is more difficult.

Other polymers, organic or inorganic pigments, dyes, fillers, plasticisers, blowing agents, light and heat stabilisers or compounds having a crosslinking effect upon the hydrolysed ethylene/vinyl acetate copolymers at elevated temperatures may be incorporated in the copolymer powders produced in accordance with the invention as water-insoluble additives in quantities of up to 50% by weight. Suitable pigments are, for example, titanium dioxide, chromium oxide green, ultramarine, cadmium red and yellow, and carbon black. Metallic effects may readily be obtained by adding aluminium and bronze powder. Suitable UV stabilisers are, for example, substituted crotonic acid esters, benzophenone derivatives and benzotriazoles of the type described, for example, in German Auslegeschrift No. 1,087,902, in Belgian Patent Specification No. 625,007 and in British Patent Specification No. 878,362. Suitable fillers are, for example, active silica, such as Vulkazit types, Aerosil types and carbon black. Suitable blowing agents, by means of which particularly light impact-resistant coatings may be obtained, are for example azodicarbonamide and diphenyl sulphone-3,3'-disulphohydrazide. Suitable crosslinkers are, for example, diisocyanates and polyisocyanates masked with phenol, caprolactam or maleic acid esters, dicarboxylic acids, polyanhydrides and other crosslinkers which are only active at elevated temperatures, i.e. at temperatures above the melting point of the polymers. Preferred plasticisers are substantially involatile alcohols which are sparingly soluble in water, such as for example commercial-grade 1,12-octadecane diol, trimethyl-1,6-hexane diol, fatty oils containing hydroxyl groups such as, for example, castor oil, or trialkylphosphates such as, for example, tri-2-ethyl hexyl phosphate.

The invention is illustrated by the following Examples:

EXAMPLES 1 to 6

500 parts by weight of an ethylene/vinyl acetate copolymer containing 33% by weight of copolymerised vinyl acetate (corresponding to a molar ratio of ethylene to vinyl acetate of 6.2:1) and having a melt index of 60 g/10 mins as determined in accordance with condition E of DIN 53 735 (at 190° C. and under a load of 21.6 Newtons) are dissolved in 600 parts by weight of toluene, followed by the addition to the resulting solution of a solution of 5 parts by weight of sodium methylate in 210 parts by weight of methanol. 160 parts by weight are then distilled off through a distillation column while boiling under reflux and approximately 96 mole % of the acetoxy groups are hydrolysed. The distillate obtained consists predominently of an azeotropic mixture of methyl acetate and methanol. After a distillation time of 6 hours, 5 parts by weight of water are added to destroy the catalyst and the solution, having a temperature of approximately 65° C. and a gellation temperature of approximately 60° C., is extruded through a jet with the cross-section indicated in Table 1 and at the rate of flow also indicated in Table 1 into water with a temperature of 55° C. The strand, which gels from the surface, is then size-reduced in water by means of an intensive stirrer equipped with sharp edged mixing elements and operated at 500 revolutions per minute, after which the coarse-grained suspension obtained is freed from adhering organic solvents by distillation with steam.

The figures set out in Table 1 show that, although it is possible, under the described conditions, to obtain powders with good free-flow properties, the proportion of material usable as a coating powder only amounts to between about 10 and 20% by weight whilst the proportion usable for heat sealing textiles amounts to only about 30% by weight. In order to obtain larger quantities of these fine-grained powder fractions, the coarse-grained material has to be subsequently ground in a suitable plastics mill, for example in a baffle-plate impact mill of the type manufactured by the Pallmann Company of Zweibrucken. By virtue of its porous quality, the coarse-grained material can be ground to particle diameters of from 80 to 200 μm without any troublesome caking of the thermoplastic material as a result of the heat generated during the grinding process.

Table 1

| Example No. | | | | | | |
|---|---|---|---|---|---|---|
| jet cross-section (mm²) | 33 | 33 | 33 | 63 | 63 | 63 |
| rate of flow (m/sec) | 0.84 | 1.68 | 2.53 | 0.44 | 0.88 | 1.32 |
| ratio by volume of solution to water | 0.11 | 0.22 | 0.33 | 0.11 | 0.22 | 0.33 |
| proportion of powder retained by a standard sieve with the mesh width indicated (% by weight) | | | | | | |
| mesh width in μm 1600 | 0 | 1.2 | 2.0 | 0.8 | 0.8 | 0.4 |
| 1000 | 8.4 | 15.2 | 19.6 | 15.7 | 12.0 | 15.6 |
| 800 | 23.2 | 31.2 | 37.2 | 30.9 | 30.0 | 32.8 |
| 630 | 44.0 | 49.2 | 55.6 | 50.6 | 51.2 | 50.4 |
| 500 | 68.8 | 68.0 | 72.0 | 67.9 | 69.2 | 67.2 |
| 315 | 84.0 | 84.4 | 85.2 | 82.4 | 84.0 | 83.2 |
| 200 | 93.2 | 92.0 | 92.8 | 90.4 | 92.8 | 90.8 |
| 80 | — | — | — | — | — | 98.4 |

EXAMPLES 7 to 11

Following the addition of 0.5% by weight, based on the polymer used, of the UV stabiliser, N-(β-cyano-β-carboxy methyl vinyl)-2-methyl-2,3-dihydroindole, the warm hydrolysis solution, prepared as described in Examples 1 to 6, of an ethylene/vinyl acetate copolymer containing 33% by weight of copolymerised vinyl acetate is extruded through a jet with a cross-section of 33 mm² into a standard commercial-grade mixer (Papenmeier's Universal Mixer NOSHK 300) with a capacity of about 500 liters which is filled with warm water (55° C.), the stirrer rotating at a speed of 550 r.p.m. The coarse-grained suspension obtained is passed through a standard commercial-grade colloid mill (PUC-mill type IM-10 manufactured by Probst and Class) with different gap settings. The fine suspension is continuously freed from adhering organic solvent by distillation with steam under reduced pressure at 50° C. and the polymer powder is filtered off under suction, washed with water and dried. A free flowing powder is obtained, its particle diameter being governed by the setting of the gap width between the rotor and the stator of the colloid mill. The particle size distribution analyses of the polymer powders obtained are shown in Table 2 below. The screen analyses were carried out by means of an Alpine air-jet sieve. The air-jet sieve was additionally provided with means for electrostatically discharging the material being sieved. It is only with this attachment that the screen analyses are reproducible.

Table 2

| Example No. | 7 | 8 | 9 | 10 | 11 |
|---|---|---|---|---|---|
| setting of the PUC mill (scale divisions) (mm) | — | 2 / 0.83 | 0.25 / 0.13 | 0 / 0.03 | 2 / 0.83 |
| mesh width of the sieve cloth for separating off the fines (μm) | — | — | — | — | 250 |
| proportion of the powder retained by a standard sieve with the mesh width indicated (% by weight) | | | | | |
| mesh width in μm: 1000 | 23 | 0 | 0 | 0 | 0 |
| 800 | 51 | 0 | 0 | 0 | 0 |
| 630 | 66 | 6 | 0 | 0 | 0 |
| 500 | 89 | 29 | 0 | 0 | 0 |
| 400 | — | 42 | 2 | 0 | 0 |
| 315 | — | 55 | 7 | 0 | 0 |
| 200 | — | 63 | 20 | 4 | 2 |
| 160 | — | — | — | — | 14 |
| 100 | — | 92 | 60 | 26 | 66 |
| 80 | — | — | 92 | 39 | 85 |
| 63 | — | — | — | 57 | 90 |
| 40 | — | — | — | 82 | — |
| 32 | — | — | — | 91 | 97 |

The screen analysis of Example 7 shows the particle size distribution of the materials size-reduced in the Papenmeier mixer. In Examples 8 to 10, the gelled hydrolysis solution, initially size-reduced in the Papenmeier mixer, was in each case re-ground at the gap width setting of the PUC mill indicated in Table 2. Example 11 was carried out at the same setting of the PUC mill as test 8, the difference being that, by means of a sieve cloth of phosphor bronze with a mesh width of 250 μm in an apparatus consisting of a water-filled container divided in two by the wire gauze, the fines of the material were continuously sieved out, whilst the coarse fraction of the material was passed in a circuit through the PUC mill. Coarse material was introduced into the mill circuit at a rate commensurate with that at which the fines formed were sieved out.

It can be seen from Table 2 that, with the mill setting of Example 9, the particle diameter of 80 to 200 μm required for use as a fluidisation dip coating powder was obtained in a yield of 72% by weight. By modifying the procedure as in Example 11, it was possible to increase the yield of this fraction to 83% by weight.

The powder obtained still contains the entire quantity of the water-insoluble UV-stabiliser, N-(β-cyano-β-carboxy methyl vinyl)-2-methyl-2,3-dihydroindole, added to the hydrolysis solution before isolation of the polymer in powder form, and is eminently suitable for the production of coatings on metal articles by fluidisation dip coating.

EXAMPLES 12 to 17

A suspension of 40% by weight of titanium dioxide pigment in a mixture of 30% by weight of methanol and 30% by weight of toluene is added at a temperature of 60° C. to, and intensively stirred with, the hydrolysis solution of an ethylene/vinyl acetate copolymer containing 33% by weight of copolymerised vinyl acetate prepared in accordance with Examples 1 to 6. The titanium dioxide pigment is added in a quantity of approximately 8% by weight, based on the ethylene/vinyl acetate copolymer used. The pigment-containing homogeneous solution is then extruded through a jet with a cross-section of 33 mm² into a Papenmeier mixer equipped with a high speed stirrer (Universal High-Speed Mixer OSHK 300, stirrer speed 575 r.p.m.), size-reduced therein at about 40° C. into a coarse-grained dispersion and then passed continuously through a type IM-8 PUC-mill at different gap settings. Following removal of the solvent by distillation with steam, the powder is filtered off, washed and dried. The filtrate is clear and pigment-free. Table 3 shows the particle size distribution of the product obtained in the Papenmeier mixer (cf. Example 12) and the particle size distribution of the powders obtained at different gas settings of the PUC mill (cf. Examples 13 to 15).

Table 3

| Example No. | 12 | 13 | 14 | 15 | 16 | 17 |
|---|---|---|---|---|---|---|
| setting of the PUC mill (scale divisions) (mm) | — | 2 0.83 | 1.5 0.63 | 0.5 0.23 | 0 0.03 | 2 0.83 |
| mesh width of the sieve cloth used for separating off the fines (μm) | — | — | — | — | — | 300 |
| proportion of powder retained by a standard sieve with the mesh width indicated (% by weight) mesh width in μm: | | | | | | |
| 1250 | 3 | 1 | 0 | 0 | 0 | 0 |
| 1000 | 10 | —0 | 0 | 0 | 0 | |
| 800 | 37 | — | 0 | 0 | 0 | 0 |
| 630 | 54 | 8 | 0 | 0 | 0 | 0 |
| 500 | 78 | 13 | 3 | 1 | 0 | 0 |
| 400 | 84 | 31 | 11 | 5 | 0 | 0 |
| 315 | 92 | 38 | 17 | — | 0 | 0 |
| 250 | — | — | — | 11 | 0 | 1 |
| 200 | 98 | 53 | 43 | — | 0 | — |
| 160 | — | — | — | 30 | 2 | 8 |
| 125 | — | 72 | 64 | 49 | 8 | 33 |
| 100 | — | — | — | 72 | 18 | 50 |
| 63 | — | 89 | 90 | 82 | 53 | 82 |
| 40 | — | — | — | — | 70 | 90 |
| 28 | —97 | 95 | 92 | 78 | 94 | |

Example 17 corresponded to Example 13 in regard to the gap setting of the colloid mill, although the fines of the suspension had been separated off by means of a finesteel gauze with a mesh width of 300 μm in an apparatus identical to that described in Example 2. The grain fraction between 63 and 250 μm in diameter required for use as a fluidisation dip coating powder was obtained in a yield of more than 80% by weight in Example 17. In the absence of the wire gauze, the yields of this fraction, even in favourable cases, only amounted to between about 50 and 70% by weight. According to Example 16, a material is obtained of which about 70% by weight has a grain size of less than 80 μm. This powder is eminently suitable for electrostatic powder coating. By means of the pigmented powders containing 9.1% by weight of titanium dioxide pigment, it was possible to obtain non-porous, smooth coatings with a high covering power both by fluidisation dip coating and also by electrostatic powder coating.

EXAMPLES 18 to 23

600 parts by weight of an ethylene/vinyl acetate copolymer containing 46% by weight of copolymerised vinyl acetate (corresponding to a molar ratio of ethylene to vinyl acetate of 3.6:1) and having a melt index of 30 g/10 mins., as determined under condition E of DIN 53 735, are dissolved in 900 parts by weight of toluene, and 150 parts by weight of toluene are distilled off to remove the adhering water. The clear solution is cooled to 70° C., after which first a solution of 1.2 parts of hydrazine hydrate in 20 parts by weight of methanol and then 12 parts by weight of sodium methylate dissolved in 130 parts by weight of methanol are pumped in while stirring. The mixture is heated for 6 hours at 65° C. and approximately 84 mole % of the acetoxy groups are hydrolysed. Then 13.3 parts by weight of glacial acetic acid are added in order to destroy the catalyst. The solution having a temperature of approximately 55° C. and a gellation temperature of approximately 50° C. is extruded through a jet with a cross-section of 63 mm² and at a rate of flow of 0.66 m/second into water with a temperature of 45° C. The gelling strand is then sized-reduced under water by means of an intensive stirrer equipped with sharp-edged mixing elements and operated at 500 revolutions per minute. Table 4 shows the particle size distributions of the suspension obtained in the manner described above (Example 18) and the particle size distributions of the powders freed from the organic solvents by distillation with steam and size-reduced by wet grinding.

Table 4

| Example No. | 18 | 19 | 20 | 21 | 22 | 23 |
|---|---|---|---|---|---|---|
| type of size-reducing machine used for wet grinding +) | — | | PUC-IM-8 | | | UT |
| setting of the PUC mill (scale divisions) (mm) | — | 3 1.23 | 2 0.83 | 1.5 0.63 | 1 0.43 | — |
| mesh width of the sieve cloth used for separating off the fines (μm) | — | — | — | — | — | 315 |
| proportion of powder retained by a standard sieve with the mesh width indicated (in % by weight) mesh width in μm: | | | | | | |
| 2000 | 4 | — | — | — | — | — |
| 1000 | 43 | 19 | 19 | 6 | 4 | — |
| 800 | 59 | — | — | — | — | — |
| 750 | — | 33 | — | — | — | — |
| 500 | 84 | 50 | 44 | 32 | 28 | — |
| 400 | — | — | 57 | 42 | 40 | — |
| 315 | — | — | 78 | 62 | 51 | 0 |
| 250 | — | 73 | — | — | 1 | — |
| 200 | 99 | — | 88 | 90 | 75 | 37 |
| 100 | — | — | 99 | 99 | 95 | 82 |
| 80 | — | — | — | — | — | 89 |
| 63 | — | 97 | — | — | — | 95 |

+) PUC-IM-8: Type IM-8 colloid mill manufactured by Messrs. Probst and Class, Rastatt
UT: Type T 45G6 Ultraturrax stirrer manufactured by Messrs. Janke and Kunkel, Staufen (Breisgau)

A type IM-8 PUC colloid mill with the gap settings indicated in Table 4 was used in Examples 19 to 22, whereas in Example 23 size reduction was carried out with a type T 45G6 Ultraturrax laboratory stirrer in combination with a sieve basket with a mesh width of 315 μm produced from wire gauze. The wire gauze basket enabled the particles which, during the size-reduction process, had reached the required grain size of less than 315 μm, to be separated off.

The polymer powder is suitable for the heat sealing of textile fabrics by the scattering method.

We claim:

1. A process for producing powdered ethylene/vinyl acetate copolymer which is partically or completely hydrolyzed, said copolymer before hydrolysis containing ethylene and vinyl acetate in copolymerized form in a molar ratio of from 1:2 to 20:1 and having at least 50 mol% of its acetoxy groups hydrolyzed, said process comprising passing an organic solvent solution of hydrolyzed copolymer, which gels at a temperature of from 20 to 80° C., at a temperature at least 5° about the gelation temperature through jets having a cross-section of from 4 to 400 mm at a rate of flow of from 0.01 to 5m/second into water which is at a temperature below but no more than 20° C. below the gelation temperature of the copolymer solution and which is free of surface-active substances, converting the solution thusly introduced into said water into particles of from 0.02 to 5mm in diameter by the application of high shearing force and removing adhering organic solvent by steam distillation.

2. A process as claimed in claim 1, wherein the solution of the partially or completely hydrolysed ethylene/vinyl acetate copolymer contains additives substantially or completely insoluble in water in quantities of less than 50% by weight, based on the dissolved hydrolysed copolymer.

3. A process as claimed in claim 1, wherein the particles from 0.02 to 5 mm in diameter are subjected to further mechanical size-reduction under water to particle diameters of less than 0.3 mm.

4. A process as claimed in claim 3, wherein, during the mechanical size reduction of the gelled particles to particle diameters of less than 0.3 mm, the particles which have already reached the required diameter are continuously removed by means of an apparatus consisting of a water-filled vessel which is divided in two by a sieve cloth and in one half of which the coarse, partially ground suspension is kept in vigorous motion and of which the second half contains the fine suspension which has passed through the sieve cloth.

5. A process as claimed in claim 1, wherein the partially or completely hydrolysed ethylene/vinyl acetate copolymer is dissolved in a solvent mixture of one or more aliphatic alcohols containing from 1 to 10 carbon atoms and their acetic acid esters.

6. A process as claimed in claim 5, wherein, in addition to the aliphatic alcohols and their acetic acid esters, the solvent mixture contains from 1 to 70% by weight of one or more organic solvents which are inert under the hydrolysis conditions.

7. A process as claimed in claim 2, wherein the warm, still liquid non-gelled solution contains inorganic or organic pigments in suspended form.

8. A process as claimed in claim 2, wherein the warm, liquid non-gelled solution contains fillers in suspended form.

9. A process as claimed in claim 2, wherein the warm, liquid non-gelled solution contains in dissolved form organic substances substantially insoluble in water which have a plasticising effect upon hydrolysed ethylene/vinyl acetate copolymers.

10. A process as claimed in claim 2, wherein the warm, liquid non-gelled solution contains in dissolved or suspended form substances substantially insoluble in water which have a crosslinking effect upon hydrolysed ethylene/vinyl acetate copolymers at temperatures above 100° C.

11. A process as claimed in claim 2, wherein the warm, liquid non-gelled solution contains in dissolved or suspended form additives substantially insoluble in water which stabilise ethylene/vinyl acetate copolymers against the effect of UV light.

* * * * *